United States Patent
McLain et al.

(10) Patent No.: US 9,208,308 B2
(45) Date of Patent: Dec. 8, 2015

(54) ALTERNATE PARTS SIGNATURE LIST FILE

(75) Inventors: Fred J. McLain, Bothell, WA (US); Todd William Gould, Marysville, WA (US); Ludwin Fuchs, Seattle, WA (US); Ben Klausner, Kirkland, WA (US); Christopher J. Morgan, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 1927 days.

(21) Appl. No.: 12/276,577

(22) Filed: Nov. 24, 2008

(65) Prior Publication Data

US 2009/0138517 A1 May 28, 2009

Related U.S. Application Data

(60) Provisional application No. 60/990,539, filed on Nov. 27, 2007.

(51) Int. Cl.
*G06F 17/30* (2006.01)
*G06F 21/51* (2013.01)

(52) U.S. Cl.
CPC .......... *G06F 21/51* (2013.01); *G06F 17/30011* (2013.01)

(58) Field of Classification Search
CPC ... G06F 17/30011; G06F 17/00; G06F 17/30; G06F 17/30156; G06F 17/30194; G06F 17/30309
USPC ............................................ 705/59; 707/822
See application file for complete search history.

(56) References Cited

U.S. PATENT DOCUMENTS

| | | | |
|---|---|---|---|
| 3,748,597 | A | 7/1973 | Reinhart |
| 4,216,168 | A | 8/1980 | Evans et al. |
| 6,044,323 | A | 3/2000 | Yee et al. |
| 6,047,165 | A | 4/2000 | Wright et al. |
| 6,085,067 | A | 7/2000 | Gallagher et al. |
| 6,173,230 | B1 | 1/2001 | Camus et al. |

(Continued)

FOREIGN PATENT DOCUMENTS

| | | |
|---|---|---|
| WO | 2009070655 A1 | 6/2009 |
| WO | 2009082592 A2 | 7/2009 |

OTHER PUBLICATIONS

Meneguzzi, Felipe, et al. "Electronic contracting in aircraft aftercare: A case study." Proceedings of the 7th international joint conference on Autonomous agents and multiagent systems: industrial track. International Foundation for Autonomous Agents and Multiagent Systems, 2008.*

(Continued)

*Primary Examiner* — Hosain Alam
*Assistant Examiner* — Nan Hutton
(74) *Attorney, Agent, or Firm* — Yee & Associates, P.C.

(57) ABSTRACT

A computer implemented method, apparatus, and computer program product for managing aircraft software parts. In one embodiment, a computer implemented method creates an alternate parts signature list part having a set of signatures for a set of stored aircraft software parts. The alternate parts signature list part is distributed to the aircraft data processing system. Each signature for a set of stored aircraft software parts on the aircraft data processing system is replaced with a corresponding signature in the alternate parts signature list part to form a set of current signatures on the aircraft data processing system.

20 Claims, 7 Drawing Sheets

(56) References Cited

U.S. PATENT DOCUMENTS

| | | |
|---|---|---|
| 6,181,992 B1 | 1/2001 | Gurne et al. |
| 6,313,759 B1 | 11/2001 | Musland-Sipper |
| 6,385,513 B1 | 5/2002 | Murray et al. |
| 6,438,468 B1 | 8/2002 | Muxlow et al. |
| 6,529,706 B1 | 3/2003 | Mitchell |
| 6,567,040 B1 | 5/2003 | Sevaston |
| 6,671,589 B2 | 12/2003 | Holst et al. |
| 6,675,382 B1 | 1/2004 | Foster |
| 6,691,004 B2 | 2/2004 | Johnson et al. |
| 6,732,031 B1 | 5/2004 | Lightner et al. |
| 6,741,841 B1 | 5/2004 | Mitchell |
| 6,748,597 B1 | 6/2004 | Frisco et al. |
| 6,795,758 B2 | 9/2004 | Sinex |
| 6,816,728 B2 | 11/2004 | Igloi et al. |
| 6,816,762 B2 * | 11/2004 | Hensey et al. ................ 701/35 |
| 6,831,912 B1 | 12/2004 | Sherman |
| 6,898,492 B2 | 5/2005 | de Leon et al. |
| 7,103,317 B2 | 9/2006 | Chang et al. |
| 7,113,851 B1 | 9/2006 | Gelon et al. |
| 7,133,767 B2 | 11/2006 | Ogino et al. |
| 7,151,985 B2 | 12/2006 | Tripmaker |
| 7,167,704 B2 | 1/2007 | Chang et al. |
| 7,194,620 B1 | 3/2007 | Hayes |
| 7,203,596 B2 | 4/2007 | Ledingham et al. |
| 7,219,339 B1 | 5/2007 | Goyal et al. |
| 7,230,221 B2 | 6/2007 | Busse et al. |
| 7,254,640 B2 | 8/2007 | Alexander |
| 7,292,579 B2 | 11/2007 | Morris |
| 7,313,143 B1 | 12/2007 | Bruno |
| 7,346,435 B2 | 3/2008 | Amendola et al. |
| 7,356,389 B2 | 4/2008 | Holst et al. |
| 7,366,589 B2 | 4/2008 | Habermas |
| 7,412,291 B2 | 8/2008 | Judd et al. |
| 7,420,476 B2 | 9/2008 | Stiffler |
| 7,426,387 B2 | 9/2008 | Wright et al. |
| 7,437,715 B2 | 10/2008 | Chatsinchai et al. |
| 7,478,381 B2 | 1/2009 | Roberts et al. |
| 7,506,309 B2 | 3/2009 | Schaefer |
| 7,516,168 B2 | 4/2009 | LeCrone et al. |
| 7,551,086 B2 | 6/2009 | Coop et al. |
| 7,555,657 B2 | 6/2009 | Nasu |
| 7,636,568 B2 | 12/2009 | Gould et al. |
| 7,647,139 B2 | 1/2010 | Sandell et al. |
| 7,653,212 B2 | 1/2010 | Haughawout et al. |
| 7,703,145 B2 | 4/2010 | Stelling et al. |
| 7,720,975 B2 | 5/2010 | Erickson |
| 7,734,740 B2 | 6/2010 | To |
| 7,747,531 B2 | 6/2010 | Cronce |
| 7,756,145 B2 | 7/2010 | Kettering et al. |
| 7,856,631 B2 | 12/2010 | Brodkorb et al. |
| 7,876,259 B2 | 1/2011 | Schuchman |
| 7,904,608 B2 | 3/2011 | Price |
| 7,908,042 B2 | 3/2011 | Brinkley et al. |
| 7,974,939 B2 | 7/2011 | Nanjangud Bhaskar et al. |
| 8,027,758 B2 | 9/2011 | Ferro et al. |
| 8,055,396 B2 | 11/2011 | Yates et al. |
| 8,074,214 B2 | 12/2011 | Isaacson et al. |
| 8,090,525 B2 | 1/2012 | Villiers |
| 8,165,930 B2 | 4/2012 | Harnish et al. |
| 8,185,254 B2 | 5/2012 | Brinkman |
| 8,185,609 B2 | 5/2012 | Fuchs et al. |
| 2002/0111720 A1 | 8/2002 | Holst et al. |
| 2002/0160773 A1 | 10/2002 | Gresham et al. |
| 2003/0003872 A1 | 1/2003 | Brinkley et al. |
| 2003/0149670 A1 * | 8/2003 | Cronce ................ 705/59 |
| 2003/0188303 A1 | 10/2003 | Barman et al. |
| 2003/0200026 A1 | 10/2003 | Pearson |
| 2003/0225492 A1 | 12/2003 | Cope et al. |
| 2003/0233178 A1 | 12/2003 | Sinex |
| 2004/0049609 A1 | 3/2004 | Simonson et al. |
| 2004/0106404 A1 | 6/2004 | Gould et al. |
| 2004/0243994 A1 | 12/2004 | Nasu |
| 2005/0065670 A1 | 3/2005 | Tripmaker |
| 2005/0071385 A1 | 3/2005 | Rao |
| 2005/0228558 A1 | 10/2005 | Valette et al. |
| 2005/0235340 A1 | 10/2005 | To |
| 2005/0286452 A1 | 12/2005 | Hardgrave et al. |
| 2006/0010438 A1 | 1/2006 | Brady et al. |
| 2006/0080451 A1 | 4/2006 | Eckert |
| 2006/0156053 A1 | 7/2006 | Judd et al. |
| 2006/0164261 A1 | 7/2006 | Stiffler |
| 2006/0229772 A1 | 10/2006 | McClary |
| 2006/0245431 A1 | 11/2006 | Morris |
| 2007/0027589 A1 | 2/2007 | Brinkley et al. |
| 2007/0114280 A1 | 5/2007 | Coop et al. |
| 2007/0198513 A1 | 8/2007 | Stelling et al. |
| 2007/0279244 A1 | 12/2007 | Haughawout et al. |
| 2008/0140278 A1 | 6/2008 | Breed |
| 2008/0208853 A1 | 8/2008 | Vismans et al. |
| 2009/0112873 A1 | 4/2009 | Nanjangud Bhaskar et al. |
| 2009/0138385 A1 | 5/2009 | Harnish et al. |
| 2009/0138516 A1 | 5/2009 | Young et al. |
| 2009/0138518 A1 | 5/2009 | Rodgers et al. |
| 2009/0138871 A1 | 5/2009 | Kimberly et al. |
| 2009/0138872 A1 | 5/2009 | Fuchs et al. |
| 2009/0138873 A1 | 5/2009 | Beck et al. |
| 2009/0138874 A1 | 5/2009 | Beck et al. |
| 2010/0017578 A1 | 1/2010 | Mansson et al. |
| 2013/0212569 A1 | 8/2013 | Young et al. |
| 2013/0246574 A1 | 9/2013 | Kimberly et al. |

OTHER PUBLICATIONS

Liou, Jing-Chiou. "When the Software Goes Beyond its Requirements—A Software Security Perspective." Information Technology: New Generations (ITNG), 2012 Ninth International Conference on. IEEE, 2012.*

U.S. Appl. No. 12/857,740, filed Aug. 17, 2010, Sampigethaya et al.

Andelsbach et al., "Embedding Trust into Cars—Secure Software Delivery and Installation", Oct. 2005,Horst Gortz Institute for IT Security, Bochum, Germany, pp. 1-15.

USPTO office action for U.S. Appl. No. 12/276,587 dated Mar. 17, 2011.

USPTO office action for U.S. Appl. No. 12/277,182 dated Mar. 9, 2011.

USPTO office action for U.S. Appl. No. 12/276,728 dated Jan. 26, 2011.

Bhagavathula et al., "Efficient Data Storage Mechanisms for DAP," Proceedings of the 23rd Digital Avionics Systems Conference (DASC '04), Oct. 2004, 7 pages.

De Boer et al., "Generic Remote Software Update for Vehicle ECUs Using a Telematics Device as a Gateway," In: Advanced Microsystems for Automotive Applications 2005, Valdorf et al., (Eds.), Springer, May 2005, pp. 371-380.

Kayton, "Avionics for Manned Spacecraft," IEEE Transactions on Aerospace and Electronic Systems, vol. 25, No. 6, Nov. 1989, pp. 786-827.

International Search Report, dated Jan. 26, 2009, regarding Application No. PCT/US2008/084824 (WO2009070655), 2 pages.

International Search Report, dated May 22, 2009, regarding Application No. PCT/US2008/084839 (WO200908592), 2 pages.

Written Opinion of the Hungarian Intellectual Property Office, dated Feb. 2, 2012, regarding Application No. 201002236-6, 9 pages.

Office Action, dated Nov. 16, 2011, regarding U.S. Appl. No. 12/277,174, 41 pages.

Final Office Action, dated Jul. 20, 2012, regarding U.S. Appl. No. 12/277,174, 29 pages.

Office Action, dated Jun. 24, 2011, regarding U.S. Appl. No. 12/275,651, 16 pages.

Notice of Allowance, dated Dec. 29, 2011, regarding U.S. Appl. No. 12/275,651, 13 pages.

Final Office Action, dated Jun. 20, 2011, regarding U.S. Appl. No. 12/276,728, 36 pages.

Notice of Allowance, dated Oct. 3, 2011, regarding U.S. Appl. No. 12/276,587, 16 pages.

Notice of Allowance, dated Jan. 24, 2012, regarding U.S. Appl. No. 12/276,587, 8 pages.

Office Action, dated Aug. 16, 2011, regarding U.S. Appl. No. 12/277,182, 26 pages.

(56) References Cited

OTHER PUBLICATIONS

Final Office Action, dated Jan. 11, 2012, regarding U.S. Appl. No. 12/277,182, 22 pages.
Office Action, dated Apr. 18, 2012, regarding U.S. Appl. No. 12/276,549, 31 pages.
Notice of Allowance, dated Sep. 20, 2012, regarding U.S. Appl. No. 12/276,549, 18 pages.
Notice of Allowance, dated Nov. 27, 2012, regarding U.S. Appl. No. 12/276,516, 18 pages.
Office Action, dated Jun. 8, 2012, regarding U.S. Appl. No. 12/276,516, 28 pages.
Office Action, dated Sep. 5, 2012, regarding U.S. Appl. No. 12/857,740, 26 pages.
Office Action, dated May 13, 2015, regarding U.S. Appl. No. 13/892,371, 32 pages.
Office Action, dated Dec. 22, 2014, regarding U.S. Appl. No. 13/892,371, 54 pages.
References Notice of Allowance, dated Feb. 6, 2015, regarding U.S. Appl. No. 13/803,728, 16 pages.
Office Action, dated Jul. 18, 2014, regarding U.S. Appl. No. 13/803,728, 54 pages.
Final Office Action, dated May 5, 2015, regarding U.S. Appl. No. 12/857,740, 18 pages.
Office Action, dated Dec. 9, 2014, regarding U.S. Appl. No. 12/857,740, 14 pages.
Final Office Action, dated Jul. 7, 2014, regarding U.S. Appl. No. 12/857,740, 15 pages.
Office Action, dated Feb. 28, 2014, regarding U.S. Appl. No. 12/857,740, 13 pages.
Final Office Action, dated Jul. 10, 2013, regarding U.S. Appl. No. 12/857,740, 16 pages.
Notice of Allowance, dated Aug. 29, 2014, regarding U.S. Appl. No. 12/276,728, 5 pages.
Final Office Action, dated Mar. 21, 2014, regarding U.S. Appl. No. 12/276,728, 16 pages.
Office Action, dated Dec. 3, 2013, regarding U.S. Appl. No. 12/276,728, 40 pages.
Frew, "Flight Demonstrations of Self-directed Collaborative Navigation of Small Unmanned Aircraft," AIAA 3rd "Unmanned Unlimited" Technical Conference, Workshop and Exhibit, Sep. 20-23, 2004, 14 pages.
Arinc, "Optimization Requirements Document for the Meteorological Data Collection and Reporting System/Aircraft Meteorological Data Relay System," National Oceanic and Atmospheric Administration (NOAA), Mar. 2006, 17 pages.

* cited by examiner

ALTERNATE PARTS SIGNATURE LIST FILE

RELATED PROVISIONAL APPLICATION

The present invention is related to and claims the benefit of priority of provisional U.S. Patent Application Ser. No. 60/990,539 entitled "Alternate Parts Signature List File", filed on Nov. 27, 2007, which is hereby incorporated by reference.

BACKGROUND INFORMATION

1. Field

The present disclosure relates generally to aircraft and, in particular, to a method and apparatus for managing software on an aircraft. Still more particularly, the present disclosure relates to a computer implemented method, apparatus, and computer usable program code for managing software or aircraft parts on an aircraft.

2. Background

Modern aircraft are extremely complex. For example, an aircraft may have many types of electronic systems on board. An electronic system on an aircraft may also be referred to as a line replaceable unit (LRU). Each line replaceable unit may further take on various forms. A line replaceable unit may be, for example, without limitation, a flight management system, an autopilot, an in flight entertainment system, a communications system, a navigation system, a flight controller, a flight recorder, and a collision avoidance system.

Line replaceable units such as these may use software or programming to provide the logic or control for various operations and functions. The software used in these line replaceable units is also commonly treated as parts in the airline industry. In particular, a software application for use in a line replaceable unit on an aircraft may also be tracked separately and referred to as a loadable aircraft software part, or aircraft software parts.

When an entity, such as an airline, receives an aircraft, aircraft software parts are typically already installed on the line replaceable units in the aircraft. In some cases, the aircraft software parts may need to be reinstalled or reloaded onto the line replaceable units in the aircraft. The installation or reloading of software may be time consuming and tedious.

Aircraft software parts are beginning to be distributed electronically to reduce the time and effort required for distributing aircraft software parts. Digital signatures are used to secure the aircraft software parts. Since aircraft signatures and their corresponding certificates expire, there is a need to update the signature validity onboard the aircraft from time to time.

Thus, it would be advantageous to have an improved method and apparatus for distributing aircraft software parts and updating their digital signatures that addresses the above described problems and others.

SUMMARY

Advantageous embodiments provide a computer implemented method, apparatus, and computer program product for managing aircraft software parts. In one embodiment, a computer implemented method creates an alternate parts signature list file having a set of signatures for a set of aircraft software parts. The alternate parts signature list file is signed, and the alternate parts signature list file is placed in a crate to form a crated alternate parts signature list file. The crated alternate parts signature list file signed to form a signed crate. The signed crate is sent to an aircraft data processing system. Each signature for an aircraft software part on the aircraft data processing system is replaced with a corresponding signature in the signed crate to form a set of current signatures on the aircraft data processing system.

In another advantageous embodiment, a set of aircraft software parts is identified. A set of signatures associated with the set of aircraft software parts is placed in a file, and the file is sent to an aircraft data processing system as an aircraft software part.

In a further advantageous embodiment, an aircraft software part containing a set signatures associated with a set of aircraft software parts is received on an aircraft. Each old signature associated with a set of aircraft software parts is replaced with an aircraft software part in the set of aircraft software parts on the aircraft with the corresponding new signature in the alternate parts signature list.

In another advantageous embodiment, an apparatus comprises an aircraft data processing system in an aircraft and a software application located on the aircraft data processing system. The software application is capable of receiving an aircraft software part having a set of signatures associated with a set of aircraft software parts in the aircraft data processing system. The software application is also capable of using a selected signature in the set of signatures in a file to authenticate a selected aircraft software part in the set of aircraft software parts stored on the aircraft data processing system to form an authenticated aircraft software part, and loading the authenticated software part onto a line replaceable unit in the aircraft data processing system.

In yet another advantageous embodiment, a computer program product comprises a computer recordable media and a program code stored on the computer recordable media. The program code includes code for identifying a set of aircraft software parts and for placing a set of signatures associated with the set of aircraft software parts in a file. The program code also includes code for sending the aircraft software part to an aircraft data processing system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
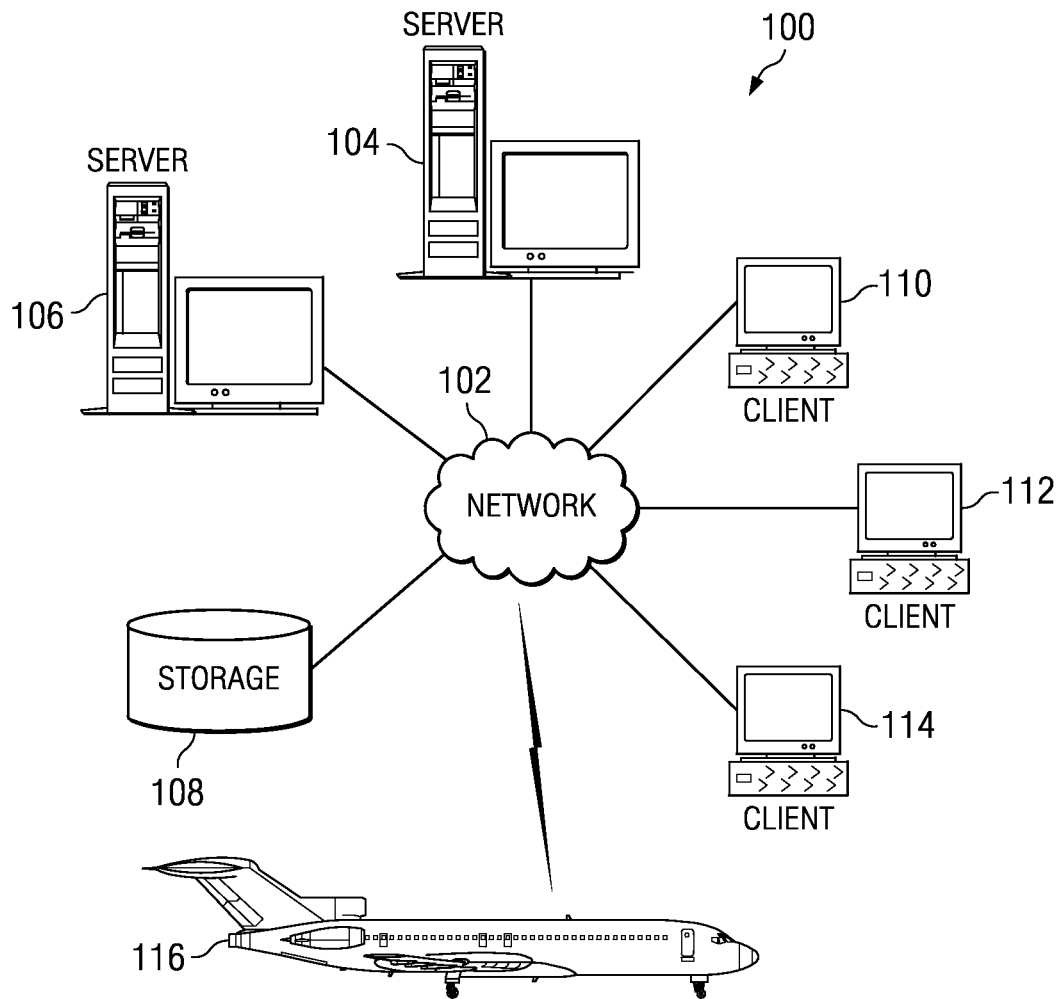
FIG. 1 is a pictorial representation of a network of data processing systems in which the advantageous embodiments may be implemented.
Figure 2:
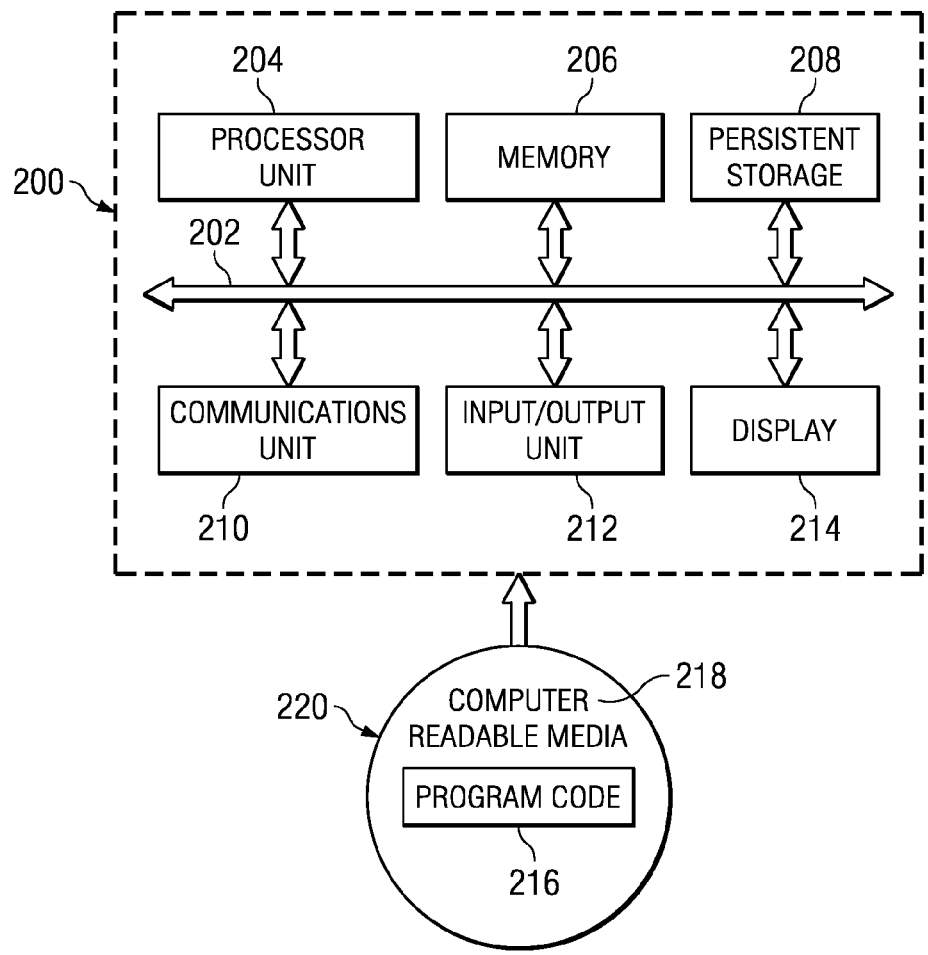
FIG. 2 is a diagram of a data processing system in accordance with an illustrative embodiment.

With reference now to the figures and in particular with reference to FIGS. 1-2, exemplary diagrams of data processing environments are provided in which advantageous embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114.

Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground.

In these examples, advantageous embodiments may be implemented in network data processing system 100 to manage aircraft software parts on an aircraft, such as aircraft 116. In particular, the different advantageous embodiments provide a computer implemented method, apparatus, and computer program product for managing signatures used to authenticate aircraft software parts on aircraft 116. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on a selectively removable computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments may be used with aircraft software parts that are signed with digital signatures. An aircraft software part may be signed with a private key. A public key for the aircraft software part is stored in the aircraft. The private and public key combinations are used to determine whether the aircraft software part is from the expected or authorized source. The public key is used to verify that the sender signed the aircraft software part and that the aircraft software part has not been modified. A modification may be due to the corruption of the aircraft software part or through tampering.

In the different advantageous embodiments, the public key is stored on the aircraft data processing system to authenticate aircraft software parts before they are loaded onto line replaceable units within the aircraft. This process is referred to as an authentication process. In other words, this private key/public key pair may be used to establish that the aircraft software part is authentic.

In the advantageous embodiments, when an aircraft is received by an airline, the public key changes from a manufacturer public key to an airline pubic key. As a result, the aircraft software parts currently on the aircraft can no longer be authenticated. In these situations, an airline may reload aircraft software parts with the aircraft software parts that have been signed with the new private key. The aircraft software parts are reloaded onto a storage device on the aircraft in case they are needed at a later point in time.

Aircraft software parts may sometimes be present on an aircraft for ten or more years before being changed. Keys are typically only valid for around two years before they expire. One manner in which the aircraft software parts may be reinstalled when signatures expire is to sign each aircraft software part with the new private key and transfer all of the aircraft software parts onto the aircraft data processing system for storage. The public key corresponding to the new private key is sent to the aircraft data processing system. This type of process is expensive and time consuming and may cause delays in the maintenance of an aircraft.

The different advantageous embodiments recognize that this type of aircraft software part management on aircraft requires an improved method and apparatus for managing signatures to reduce the amount of time and effort needed to reload the aircraft software parts. In other words, the different advantageous embodiments recognize that it would be useful to avoid redistributing all aircraft software parts onto an aircraft data processing system if signatures for these parts expire.

If the signatures for the aircraft software parts have expired or are no longer valid for some other reason, the aircraft software parts have to be reloaded onto the line replaceable units in the aircraft. With this situation, the aircraft software parts have to be re-signed, or signed again, with a new valid private key. As used herein, the terms resign, resigned, or resigning are meant to convey an act of providing a new signature. The aircraft software parts with the new signatures are then reloaded into storage on the aircraft. A new public key corresponding to the private key is loaded onto the aircraft data processing system. The aircraft software parts can then reinstalled onto the line replaceable units in the aircraft if needed.

Thus, it would be advantageous to have an improved method and apparatus for distributing aircraft software parts that solves the above described problems.

Figure 3:
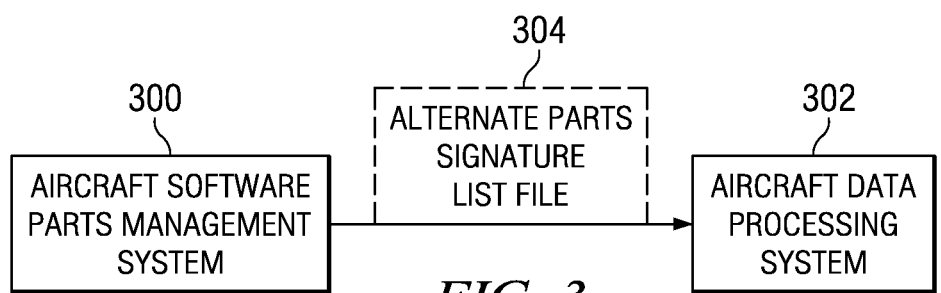
FIG. 3 is a diagram illustrating a mechanism for re-signing aircraft parts in accordance with an advantageous embodiment.

Turning now the FIG. 3, a diagram illustrating a mechanism for resigning aircraft parts is depicted in accordance with an advantageous embodiment. In this example, aircraft software parts management system 300 is a software management system for an entity, such as an airline, a maintenance repair and overhaul provider (MRO), or a military squadron. Aircraft software parts management system 300 may be located on a ground data processing system, such as sever 104 in FIG. 1, on which aircraft software parts may be managed and stored.

Aircraft data processing system 302, in these examples, is a set of computers on an aircraft, such as aircraft 116 in FIG. 1. As used in the different illustrative examples, "a set" refers to one or more items. For example, a set of computers is one or more computers, and a set of signatures is one or more signatures. Aircraft data processing system 302 contains aircraft software parts with signatures.

Instead of re-distributing each aircraft software part with a new signature, the different advantageous embodiments send the new signatures without the aircraft software parts. The signatures are generated from the aircraft software parts stored on the ground, and the signatures are used on the aircraft data processing system to authenticate the aircraft software parts on the aircraft.

In these examples, the aircraft software part is alternate parts signature list file 304. This file contains the signatures for aircraft software parts on aircraft data processing system 302. By placing a list of the new signatures for each of the aircraft parts on aircraft data processing system 302 into alternate parts signature list file 304, only this file is loaded onto aircraft data processing system 302, instead of all of the aircraft software parts. For example, an aircraft fleet may have over 500 aircraft software parts, and an aircraft may have 200 or more aircraft software parts that require signatures.

Alternate parts signature list file 304 contains the new signatures for each of the aircraft software parts. These new signatures may replace the current signatures stored on aircraft data processing system 302 for each of the aircraft software parts. As a result, when an aircraft software part is to be loaded onto a line replaceable unit on an aircraft, a valid signature is present allowing the aircraft software part to be authenticated before loading onto a line replaceable unit.

A signature may expire if the signature is too old or past an expiration date. This situation results in an invalid signature. An invalid signature may also be present if, for example, without limitation, ownership of the aircraft changes. Signatures for the previous owner become invalid even though the signature may not have expired.

Figure 4:
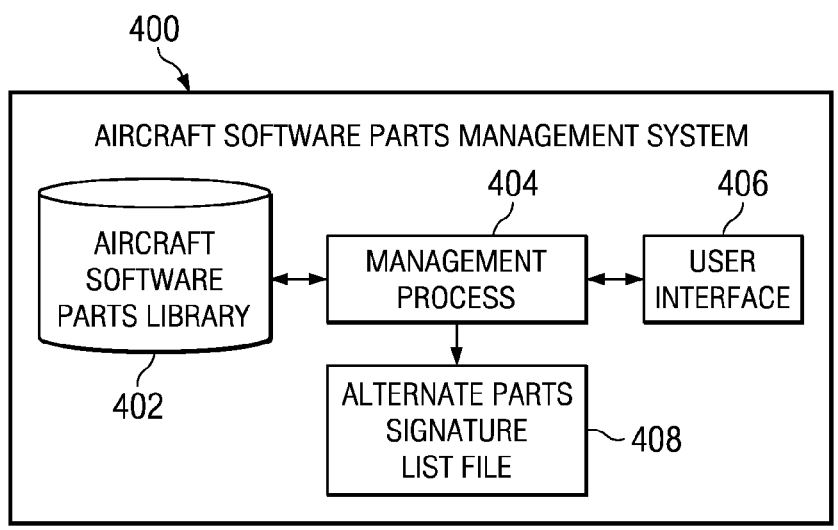
FIG. 4 is a diagram of a aircraft software parts management system in accordance with an advantageous embodiment.

Turning now to FIG. 4, a diagram of an aircraft software parts management system is depicted in accordance with an advantageous embodiment. In this example, aircraft software parts management system 400 is an example of one implementation of aircraft software parts management system 300 in FIG. 3.

In this example, aircraft software parts management system 400 includes aircraft software parts library 402, management process 404, and user interface 406. These aircraft software parts may be managed through management process 404. A user may operate management process 404 through user interface 406, in these examples. Management process 404 may be used to distribute aircraft software parts to different aircraft.

Management process 404 may include processes to receive an aircraft software part for inclusion within aircraft software parts library 402. Further, management process 404 includes processes or code used to authenticate aircraft software parts within aircraft software parts library 402. Further, management process 404 also may sign the different aircraft software parts within aircraft software parts library 402 prior to the distribution of these aircraft software parts to various aircraft managed by aircraft software parts management system 400.

In these examples, the signing process includes inputting the aircraft software part and a private key into a signing algorithm that generates the signature for the aircraft software part as a result of the inputs. The different advantageous embodiments may use any signing algorithm or process that is available. The particular algorithm or process used depends on the particular implementation.

Additionally, in the advantageous embodiments, management process 404 may be used to generate alternate parts signature list file 408. Alternate parts signature list file 408 may contain signatures for one more aircraft software parts within aircraft software parts library 402. In the depicted embodiments, these signatures are "detached signatures" because they are not integrated as part of the aircraft software parts. This file may take the form of an aircraft software part for loading onto an aircraft data processing system, in these examples.

Alternate parts signature list file 408 also may have a digital signature to indicate the authenticity of the part that contains this file. In these examples, alternate parts signature list file 408 may be an extensible markup language (XML) data structure containing the signature. An extensive markup language signature, in these examples, may be used to sign data resources, such as aircraft software parts library 402.

When signatures expire or are no longer valid for some other reason, an operator may select a set of aircraft software parts from aircraft software parts library 402 for signature generation in the alternate parts signature list file 408. In other embodiments, all of the aircraft software parts within aircraft software parts library 402 may have signatures generated and placed into alternate parts signature list file 408. Valid aircraft software parts are parts with valid signatures.

Alternate parts signature list file 408 may then be sent to an aircraft for use in replacing expired signatures for aircraft software parts on the aircraft. In the depicted examples, alternate parts signature list file 408 is sent in the form of an aircraft software part to the aircraft data processing system. This form is used to have the aircraft data processing system receive and store the file, containing these signatures, as an aircraft software part. This part also is signed, like other aircraft software parts.

Figure 5:
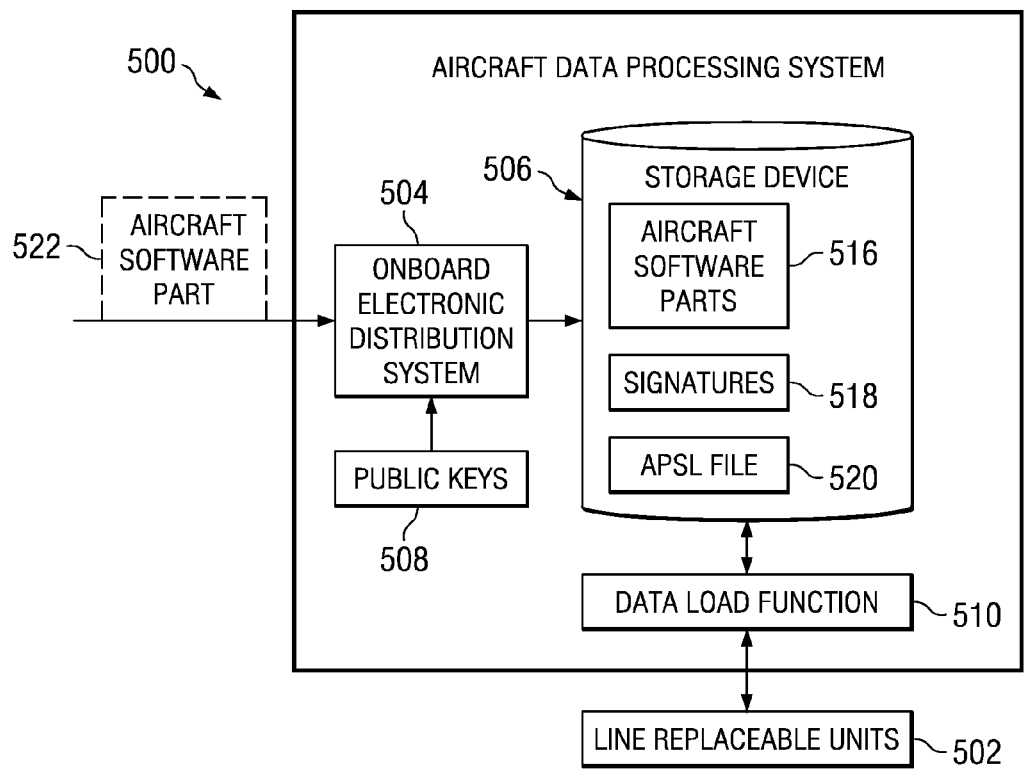
FIG. 5 is a diagram of an aircraft data processing system and line replaceable units in accordance with an advantageous embodiment.

Turning now to FIG. 5, a diagram of an aircraft data processing system and line replaceable units is depicted in accordance with an advantageous embodiment.

In this example, aircraft data processing system 500 and line replaceable units 502 are located on an aircraft. Line replaceable units 502 are different data processing systems on the aircraft that perform various functions. For example, line replaceable units 502 may include, for example, an in-flight entertainment system, an autopilot, a flight management system, a hydraulics system, or an air conditioning unit.

In this example, aircraft data processing system 500 includes onboard electronic distribution system 504, storage device 506, and data load function 510. Onboard electronic distribution system 504 may store public keys 508. Storage device 506 stores aircraft software parts 516 and signatures 518. In these examples, signatures 518 are separate data structures from aircraft software parts 516. In these examples, signatures 518 take the form of extensible mark up language (XML) signatures.

In these examples, onboard electronic distribution system 504 performs authentication of the aircraft software parts when the parts are received and just before the parts are loaded on to line replaceable units 502. Onboard electronic distribution system 504 is used to authenticate an aircraft software part in aircraft software parts 516 before a data load function loads the aircraft software part onto line replaceable units 502.

Onboard electronic distribution system 504 performs authentication processes on a software part in aircraft software parts 516 to determine whether that software can be loaded onto a line replaceable unit in line replaceable units 502 by data load function 510. If a signature corresponding to the aircraft part to be loaded onto line replaceable units 502 has expired or is invalid for some other reason, data load function 510 will not load that aircraft software part onto line replaceable units 502.

In the different advantageous embodiments, alternate parts signature list (APSL) file 520 may be loaded as an aircraft software part, such as aircraft software part 522, by onboard electronic distribution system 504 and stored in storage device 506. Signatures within alternate parts signature list file 520 may be used to replace invalid signatures within signatures 518. As a result, aircraft software parts with expired signatures do not have to be re-distributed to aircraft data processing system 500.

This type of feature is especially advantageous when signatures expire for multiple aircraft software parts within aircraft software parts 516. Further, when a new aircraft is delivered, aircraft software parts 516 do not have to be re-distributed in their entirety with the use of alternate parts signature list file 520 to replace an invalid signature in signatures 518.

In other advantageous embodiments, instead of replacing signatures 518, onboard electronic distribution system 504 may check a current signature within signatures 518. If the current signature expired, then onboard electronic distribution system 504 may check alternate parts signature list file 520 to see whether the corresponding new signature is present in this aircraft software part. If the corresponding new signature is present in alternate parts signature list file 520, onboard electronic distribution system 504 may perform the authentication with that new signature.

Figure 6:
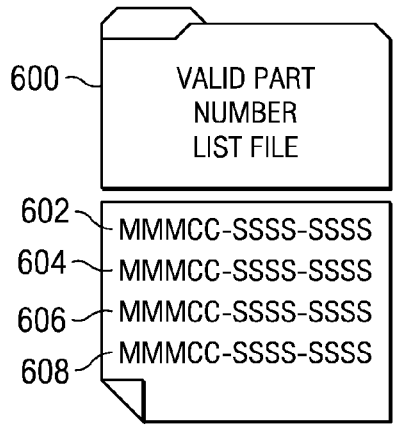
FIG. 6 is a diagram of a valid part list in accordance with an advantageous embodiment.

Turning now to FIG. 6, a diagram of a valid part list file is depicted in accordance with an advantageous embodiment. Valid part number list file 600 contains a list of parts that are to be included in an alternate parts signature list file. In this example, parts 602, 604, 606, and 608 are present in valid part number list file 600. This file may be created through a user selecting parts located in an aircraft software parts library. Alternatively, valid part number list file 600 may include all of the part numbers present in the library. In yet other embodiments, this file may contain all part numbers within a particular type of aircraft or class of aircraft.

Figure 7:
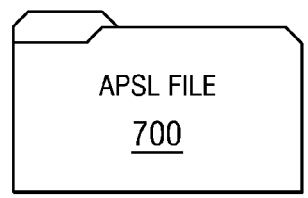
FIG. 7 is a diagram illustrating an alternate parts signature list file in accordance with an advantageous embodiment.
Figure 7:
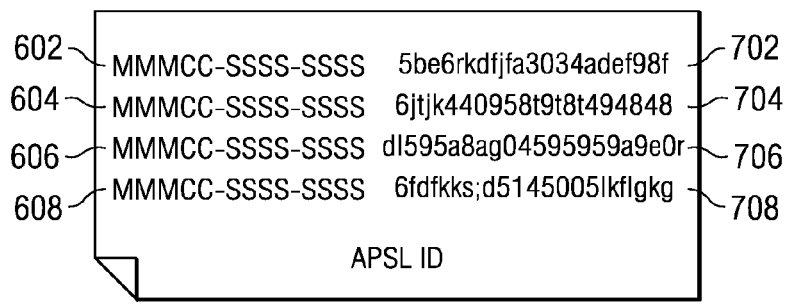

With reference now to FIG. 7, a diagram illustrating an alternate parts signature list file is depicted in accordance with an advantageous embodiment. In this example, alternate parts signature list file 700 includes an identification of parts 602, 604, 606, and 608 from valid part number list file 600 in FIG. 6. This file is an example of alternate parts signature list file 304 is FIG. 3, alternate parts signature list file 408 in FIG. 4, and alternate parts signature list file 520 in FIG. 5. In addition, signatures 702, 704, 706, and 708 are new valid signatures generated for these different parts.

Figure 8:
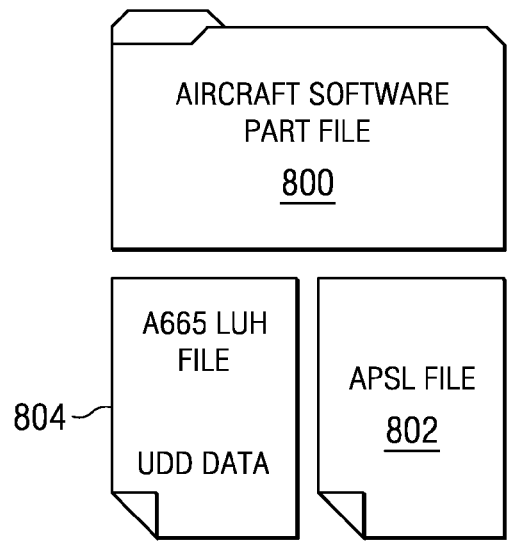
FIG. 8 is a diagram illustrating an alternate parts signature list file in the form of a aircraft software part in accordance with an advantageous embodiment.

With reference now to FIG. 8, a diagram illustrating an alternate parts signature list file in the form of an aircraft software part is depicted in accordance with an advantageous embodiment. In this example, aircraft software part 800 includes alternate parts signature list file 802 and header file 804. Alternate parts signature list file 802 is a file, such as alternate parts signature list file 700 in FIG. 7.

Header file 804, in these examples, is a header file that identifies alternate parts signatures list file 802 as a loadable aircraft software part. In these examples, the header is defined through a standard promulgated by Aeronautical Radio, Incorporated (ARINC). The standard used is an ARINC 665, in these examples. In particular, the aircraft software part is an airline modifiable information (AMI) aircraft software part. This part also includes information to identify aircraft software part file 800 as being a part that can be loaded onto the aircraft data processing system.

Figure 9:
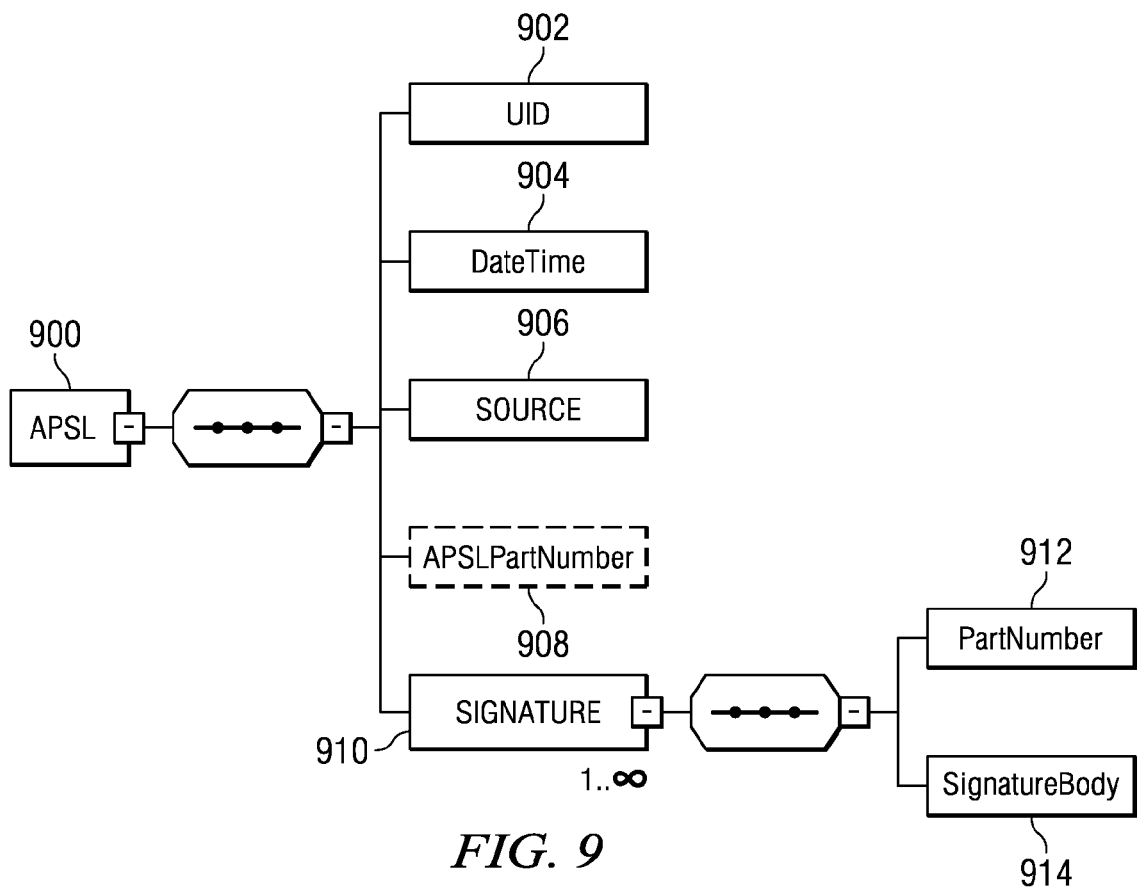
FIG. 9 is a diagram illustrating a structure of an alternate parts signature list file in accordance with an advantageous embodiment.

Turning now to FIG. 9, a diagram illustrating a structure of an alternate parts signature list file is depicted in accordance with an advantageous embodiment. In this example, alternate parts signature list file 900 includes unique identifier 902, date/time 904, source 906, alternate parts signature list file part number 908, and signature 910. Signature 910 includes part number 912 and signature body 914.

Unique identifier 902 is a unique identifier that identifies alternate parts signature list file 900 from other lists or aircraft software parts, in these examples. Date/time 904 is the date and time when alternate parts signature list file 900 was created. Source 906 identifies the source that created alternate parts signature list file 900. In these examples, the source may be, for example, a particular user or system.

Alternate parts signature list file part number 908 identifies the alternate parts signature list file as a particular aircraft part. Part number 912 contains the part number of the aircraft software part. Signature body 914 is an encoded signature extensive markup language file, in these examples. Of course, signature body 914 may use other types of signatures other than extensive markup language signatures.

Figure 10:
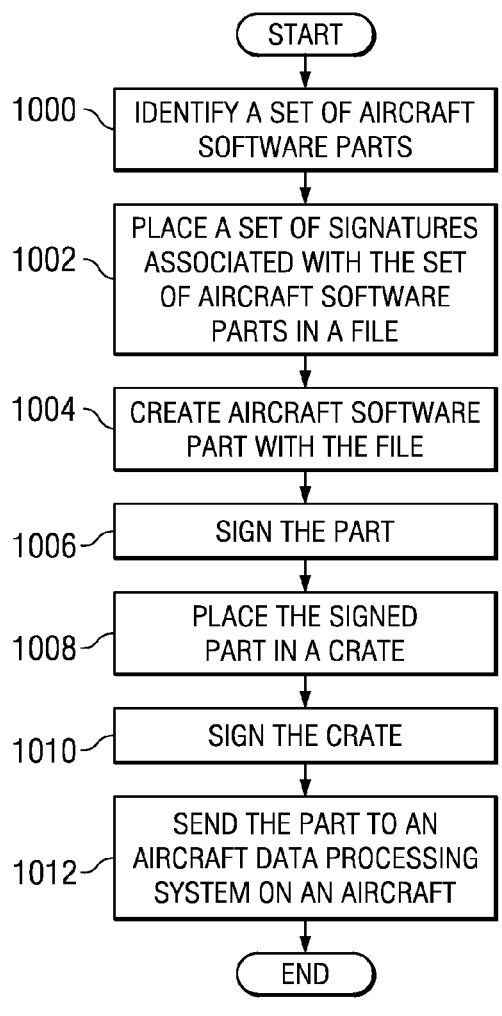
FIG. 10 is a flowchart of a process for managing aircraft software parts in accordance with an advantageous embodiment.

Turning next to FIG. 10, a flowchart of a process for managing aircraft software parts is depicted in accordance with an advantageous embodiment. The process illustrated in FIG. 10 may be implemented in an aircraft software part management system, such as aircraft software parts management system 400 in FIG. 4 in the illustrative example. Of course, these steps may be implemented in other data processing systems or computer devices, depending on the particular implementation.

The process begins by identifying a set of aircraft software parts (operation 1000). This set of aircraft software parts may be identified in a number of different ways. For example, a user may select the set of aircraft software parts from an aircraft software parts library. Alternatively, the set of aircraft software parts may be identified by a computer implemented process. For example, management process 404 in FIG. 4 may identify some or all aircraft software parts within aircraft software parts library 402 in FIG. 4 without using input to form a set of aircraft software parts. The identification may be made based on a set of rules. For example, a rule may specify selecting the aircraft software parts as any aircraft software part that is for a particular model or manufacturer of aircraft.

Thereafter, a set of signatures associated with the set of aircraft software parts are placed into a file (operation 1002). In these examples, each signature in the file associated with a particular aircraft software part is a signature generated using the aircraft software part. In these examples, the digital signature is created using a private key. A public key located on the aircraft is used to authenticate the signature. In other words, the public key may be used to determine whether the aircraft software part associated with the signature is actually from the recorded source and/or unmodified.

The process then creates an aircraft software part with the file containing the signatures (operation 1004). In these examples, the aircraft software part may be created from the file containing the signatures for the aircraft software parts by adding or associating a header or header file, such as header file 804 in FIG. 8.

By creating an aircraft software part from the file containing the digital signatures, the digital signatures may be transmitted to an aircraft data processing system as part of a normal process of transferring aircraft software parts. As a result, special or different procedures do not have to be created to introduce the signatures onto the aircraft data processing system. The aircraft data processing system recognizes these digital signatures as being an aircraft software part for purposes of receiving and storing the digital signatures.

The process signs the part (operation 1006). In these examples, the signing is performed using a private key. A public key may later be used in an authentication to prove that the part is authentic. Thereafter, the signed part is placed into a crate (operation 1008). In these examples, a crate is a file using a file format that may store a set of files, such as aircraft software parts.

The set of files in the crate may be compressed to reduce their size. In other words, a crate acts as a wrapper for one or more items. An example of a crate system is a ZIP file format. Another example is a Java® archive file format. These types of files also may be used as crates in a different advantageous embodiment.

Thereafter, the process signs the crate (operation 1010). Operations 1004-1010 are optional steps that may be used in some, but not all of the advantageous embodiments. At this point, a signed crate is ready for transmission to the aircraft data processing system. The process sends the part to an aircraft data processing system on an aircraft (operation 1012).

In operation 1012, the part may be sent to the aircraft data processing system in a number of different ways. For example, a wireless communications link may be used to send the part to the aircraft data processing system. With this type of communications link, the aircraft may be located in various locations, such as, for example, a runway, a boarding terminal, a maintenance facility, or the air.

Alternatively, the file may be sent to the aircraft data processing system through a physical means. For example, an operator may carry a storage device containing the file and connect the storage device to the aircraft data processing system to transfer the file to the aircraft data processing system. This storage device may be, for example, a compact disc, a flash memory, or a hard drive on a laptop computer.

Figure 11:
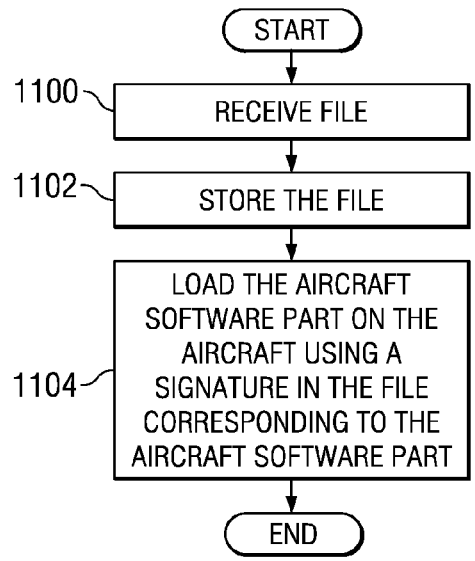
FIG. 11 is a flowchart of a process for managing aircraft software parts on an aircraft in accordance with an advantageous embodiment.

Turning now to FIG. 11, a flowchart of a process for managing aircraft software parts on an aircraft is depicted in accordance with an advantageous embodiment. The process illustrated in FIG. 11 may be implemented in an aircraft data processing system, such as aircraft data processing system 500 in FIG. 5. In particular, the different illustrative processes may be implemented in a software component, such as onboard electronic distribution system 504 and data load function 510 in FIG. 5.

The process begins by receiving the file containing the set of signatures (operation 1100). In these examples, the file is received in the form of an aircraft software part. Of course, in other embodiments, the file may be received in a format other than as an aircraft software part, depending on the particular implementation. As an example, the file may be received as an extensible mark up language file in other embodiments.

The file is stored (operation 1102). The process then loads an aircraft software part on the aircraft using a signature in the file corresponding to the aircraft software part (operation 1104). The process then terminates. This operation occurs when an aircraft software part stored on the aircraft data processing system is to be loaded onto a line replaceable unit within the aircraft. The digital signature corresponding to the aircraft software part is used in place of the old digital signature, which may have expired or become invalid for other reasons.

Figure 12:
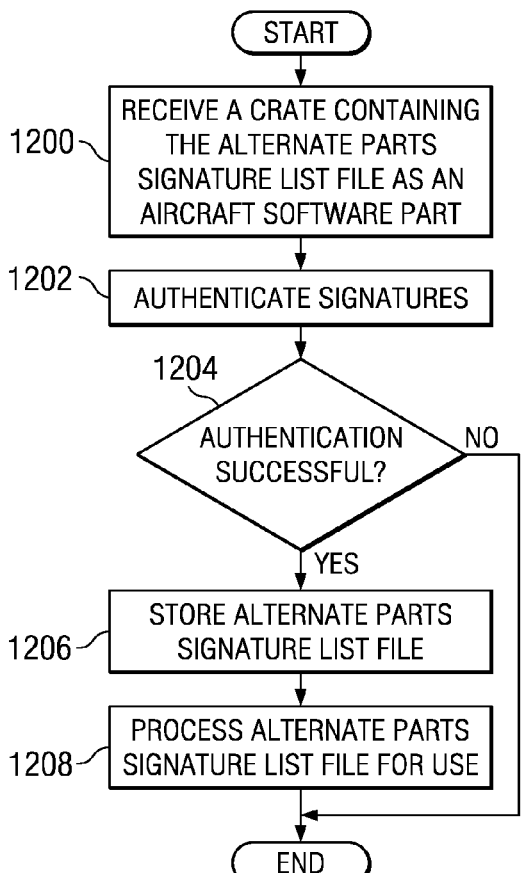
FIG. 12 is a flowchart of a process for receiving an alternate parts signature list file in accordance with an advantageous embodiment.

With reference now to FIG. 12, a flowchart of a process for receiving an alternate parts signature list file is depicted in accordance with an advantageous embodiment. The process illustrated in FIG. 12 may be implemented in an aircraft data processing system, such as aircraft data processing system 500 in FIG. 5. In particular, the different processes may be implemented using onboard electronic distribution system 504 in FIG. 5.

The process begins by receiving a crate containing the alternate parts signature list file as an aircraft software part (operation 1200). The process authenticates the signatures on the crate and the aircraft software part (operation 1202). A signature may be authenticated using a signature verifying algorithm. This type of algorithm uses the signature or the signed file and a public key corresponding to the private key used to generate the signature. The algorithm used will depend on the particular implementation.

A determination is made as to whether the authentication is successful (operation 1204). If the authentication is successful, the process stores the alternate parts signature list file in storage on the aircraft (operation 1206). In this example, the storage may be storage device 506 in FIG. 5.

The process then processes the alternate parts signature list file for use (operation 1208), with the process terminating thereafter. In operation 1208, the signatures within the alternate parts signature list file may be used to replace old signatures corresponding to the aircraft software parts.

In other embodiments, the alternate parts signature list file may be stored and maintained without replacing signatures. In this type of embodiment, if an authentication process fails with an existing signature, the alternate parts signature list file is consulted to determine whether a signature is present for the aircraft software part that failed authentication. If the signature is present, then that signature is used to perform the authentication. With reference again to operation 1204, if the authentication is not successful, the process terminates.

Figure 13:
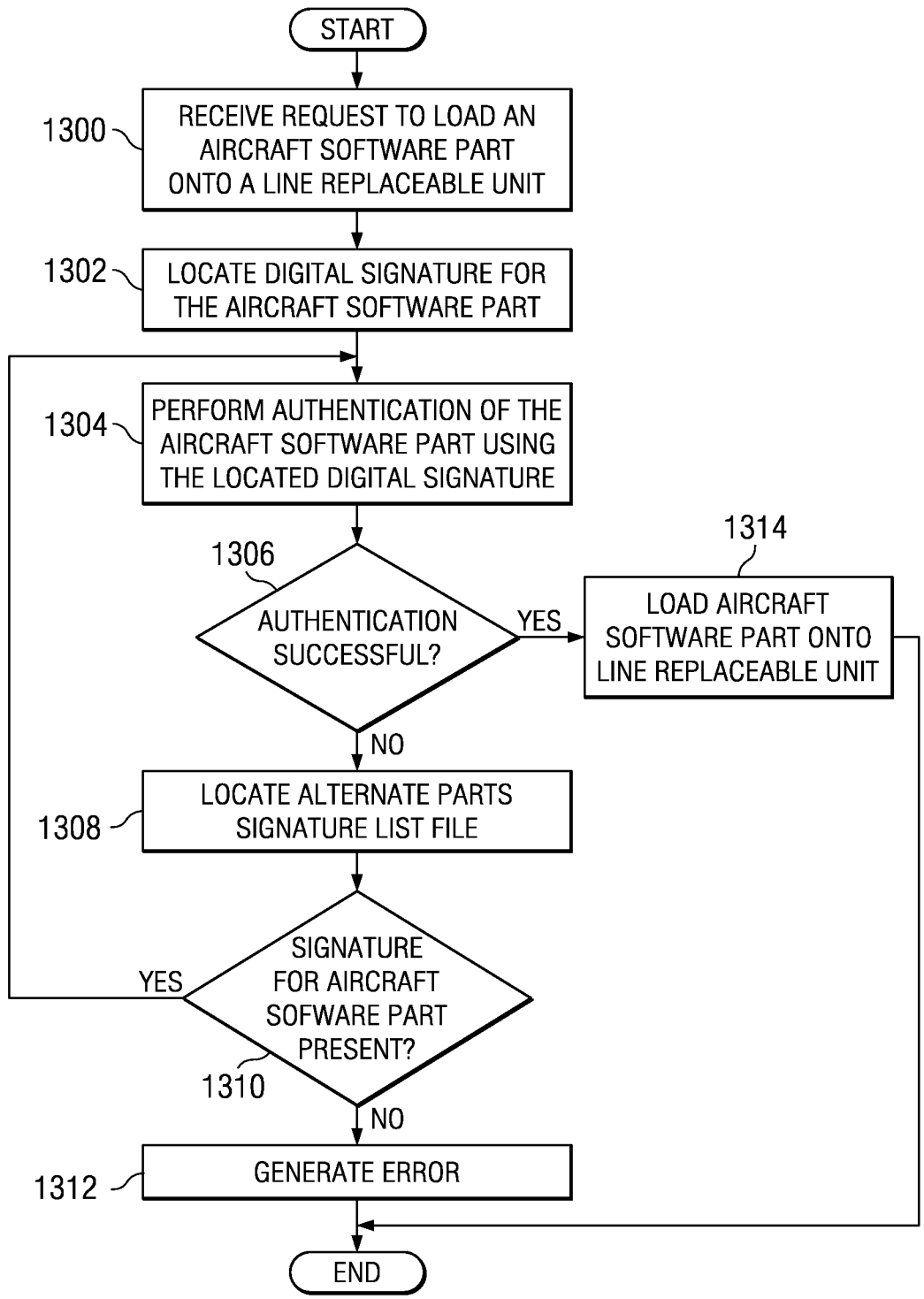
FIG. 13 is a flowchart of a process for loading a aircraft software part in accordance with an advantageous embodiment.

With reference now to FIG. 13, a flowchart of a process for loading an aircraft software part is depicted in accordance with an advantageous embodiment. The process illustrated in FIG. 13 may be implemented in an aircraft data processing system, such as aircraft data processing system 500 in FIG. 5. In particular, the process may be implemented using data load function 510 in FIG. 5.

The process begins by receiving a request to load an aircraft software part onto a line replaceable unit (operation 1300). In these examples, a request is initiated by a human operator. Of course, in other embodiments, the request may be initiated through other mechanisms. For example, an event, such as a message sent from an airline server to the aircraft data processing system may be used to initiate this process.

The digital signature for an aircraft software part is located (operation 1302). Authentication is performed on the aircraft software part using the located digital signature (operation 1304). A determination is made as to whether the authentication is successful (operation 1306). If the digital signature is no longer valid, the authentication is not successful.

In this case, the alternate parts signature list file is located (operation 1308). A determination is made as to whether a signature for the aircraft software part is present in the alternate parts signature list file (operation 1310). If the signature is present, the process returns to operation 1304 to perform authentication using this located signature. The authentication may also fail for other reasons. For example, if the digital signatures and/or aircraft software part becomes corrupted, the authentication will fail. In these examples, if the signature is not present, an error is generated (operation 1312), with the process terminating thereafter.

With reference again to operation 1306, if the authentication of the aircraft software part is successful, the aircraft software part is loaded from storage onto a line replaceable unit (operation 1314), with the process terminating thereafter.

Figure 14:
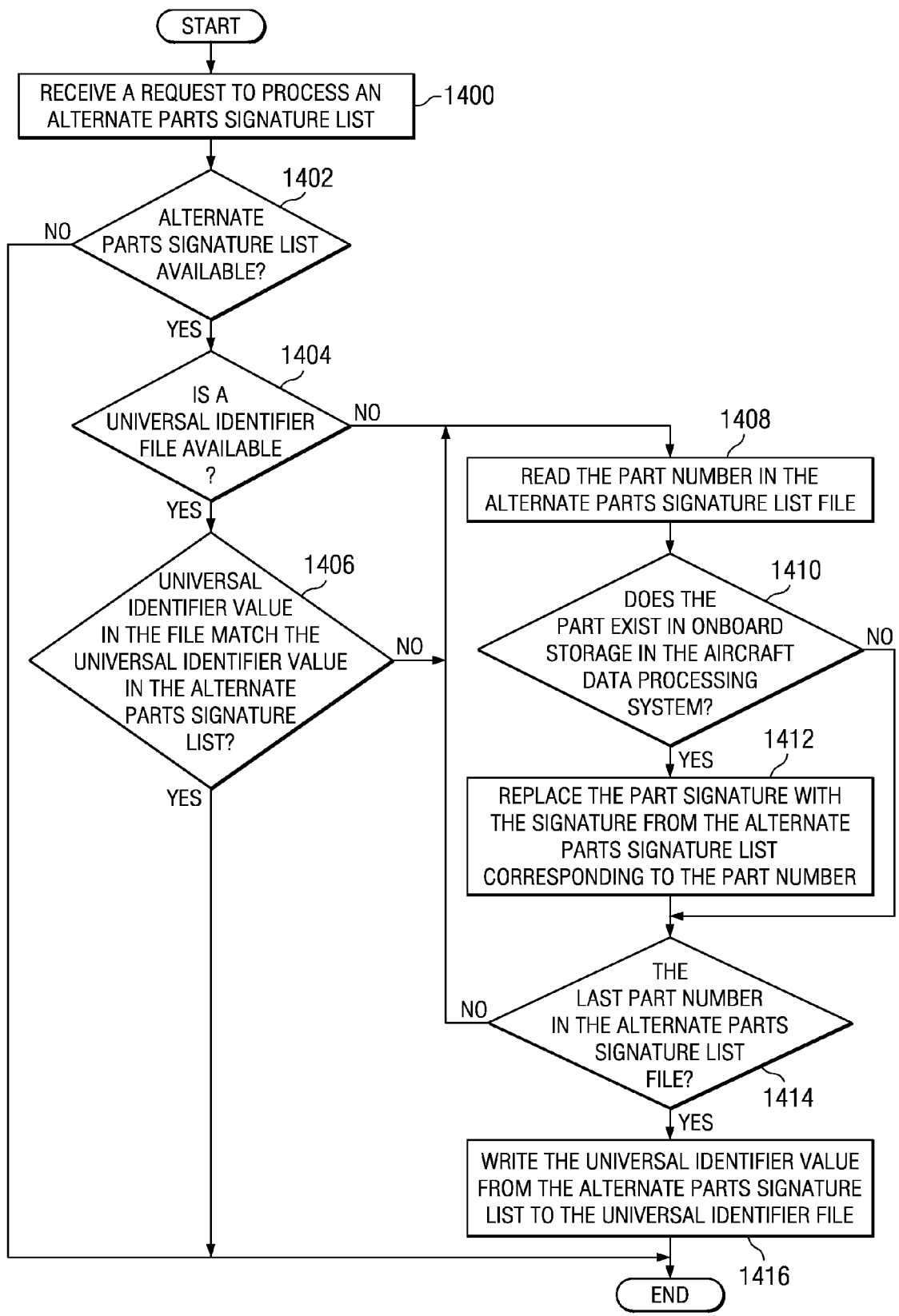
FIG. 14 is a flowchart of a process for processing an alternate parts signature list in accordance with an advantageous embodiment.

Turning now to FIG. 14, a flowchart of a process for processing an alternate parts signature list is depicted in accordance with an advantageous embodiment. In this example, the process illustrated in FIG. 14 may be implemented in an aircraft data processing system, such as aircraft data processing system 500 in FIG. 5. In particular, the process may be implemented using onboard electronic distribution system 504 in FIG. 5.

The process begins by receiving a request to process an alternate parts signature list (operation 1400). A determination is made as to whether an alternate parts signature list is available for processing (operation 1402). If an alternate parts signature list is available, a determination is made as to whether a universal identifier (UID) file is available (operation 1404).

If a universal identifier file is available, a determination is made as to whether the universal identifier value in the universal identifier file matches the universal identifier value in the alternate parts signature list (operation 1406). If the universal identifier value in the file does not match the universal identifier value in the alternate parts signature list, the process reads the part number in the alternate parts signature list file (operation 1408).

A determination is made as to whether the part exists in the onboard storage in the aircraft data processing system (operation 1410). The determination in this example is made using the part number in the alternate parts signature list file and comparing that number with additional parts on the aircraft data processing system. If the part exists on the aircraft data processing system, the process replaces the part signature with the signature from the alternate parts signature list corresponding to the part number (operation 1412).

Thereafter, the process determines whether the part number in the alternate parts signature list file is the last part number in the file (operation 1414). If the part number is the last part number, the process writes the universal identifier value from the alternate parts signature list to the universal identifier file (operation 1416), with the process terminating thereafter.

With reference again to operation 1414, if the part number is not the last part number in the alternate parts signature file list, the process returns to operation 1408 to read another part number from the alternate parts signature list file. With reference back to operation 1410, if the part does not exist in the aircraft data processing system, the process continues to operation 1414 as described above.

Turning back to operation 1406, if the universal identifier value in the file matches the universal identifier value in the alternate parts signature list, the process terminates. With reference again to operation 1404, if a universal identifier file is unavailable, the process proceeds to operation 1408 as described above. With reference back to operation 1402, if an alternate parts signature list is unavailable, the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer useable code for managing aircraft software parts. In the different advantageous embodiments, a set of aircraft software parts are identified, a set of signatures associated where these set of aircraft software parts are placed in the file. The file is then sent to the aircraft data processing system. The signatures in the file may be used to authenticate the set of aircraft software parts that are located on the aircraft. In this manner, reinstalling each aircraft software part for which a digital signature has expired is avoided.

Instead, with some or all of the different advantageous embodiments, only the digital signatures need to be sent to the aircraft. This reduction in the amount of information sent to the aircraft saves both bandwidths in a network as well as time and expense that are currently needed to reinstall each aircraft software part with the new digital signature.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. For example, although the new signatures in the alternate parts signature list file files in these examples are turned into or created in the form of an aircraft part for distribution onto an aircraft, other formats may be used.

For example, the signatures may be sent as part of a data file rather then an aircraft software part depending on the particular implementation. Further, these processes illustrated in the advantageous embodiments may be applied to other types of vehicles or devices. For example, the different advantageous embodiments may be applied to vehicles, such as, for example, without limitation, submarines, surface ships, cars, a spacecraft in which software parts may be reloaded onto different data processing systems from storage located on the vehicles. Further, the different advantageous embodiments may be applied to any devices that store software parts that may be reloaded onto different systems in which authentication is required for reloading.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for managing aircraft software parts, the computer implemented method comprising:
   creating an alternate parts signature list file having a set of signatures for a set of aircraft software parts;
   signing the alternate parts signature list file;
   placing the alternate parts signature list file in a crate to form a crated alternate parts signature list file;
   signing the crated alternate parts signature list file to form a signed crate;
   sending the signed crate to an aircraft data processing system as a aircraft software part; and
   replacing each signature for an aircraft software part on the aircraft data processing system with a corresponding signature in the signed crate to form a set of current signatures on the aircraft data processing system.

2. The computer implemented method of claim 1, wherein the sending step comprises:
   sending the signed crate to an onboard electronic distribution system on the aircraft data processing system.

3. The computer implemented method of claim 1 further comprising:
   validating a particular aircraft software part prior to loading onto a line replaceable unit using a corresponding current signature for the set of current signatures.

4. The computer implemented method of claim 3, wherein the loading step is initiated by a human operator.

5. The computer implemented method of claim 1 wherein sending the signed crate comprises sending the signed crate having the set of signatures without corresponding aircraft software parts associated with the set of signatures.

6. A computer implemented method for managing aircraft software parts, the computer implemented method comprising:
   identifying a set of aircraft software parts;
   placing a set of signatures associated with the set of aircraft software parts in a file;
   sending the file as an aircraft software part to an aircraft data processing system, in which the set of signatures correspond to existing aircraft software parts having corresponding old signatures; and
   replacing the corresponding old signatures with the set of signatures.

7. The computer implemented method of claim 6 further comprising:
   storing the aircraft software part in the aircraft data processing system;
   using a selected signature in the set of signatures in the a aircraft software part file to authenticate a selected aircraft software part in the set of aircraft software parts stored on the aircraft data processing system to form an authenticated aircraft software part; and
   loading the authenticated software part onto a line replaceable unit in the aircraft.

8. The computer implemented method of claim 6, wherein the loading step is initiated by a human operator.

9. The computer implemented method of claim 6, wherein the corresponding old signatures comprise expired signatures.

10. The computer implemented method of claim 6, wherein the placing step comprises:
    placing the set of signatures associated with the set of aircraft software parts in the file;
    creating the aircraft software part from the file;
    signing the aircraft software part to form a signed aircraft software part; and
    placing the signed aircraft software part in a crate to form a crated aircraft software part.

11. The computer implemented method of claim 6, wherein the aircraft software part is stored in a crate.

12. The computer implemented method of claim 6, wherein the set of signatures is a set of extensible markup language signatures.

13. A computer implemented method for managing aircraft software parts, the computer implemented method comprising:
    receiving a aircraft software part containing a set of signatures associated with a set of aircraft software parts on an aircraft; and
    replacing each old signature associated with each aircraft software part in the set of aircraft software parts on the aircraft with a corresponding new signature in the aircraft software part.

14. The computer implemented method of claim 13 further comprising:
    placing the set of signatures associated with the set of aircraft software parts in a file;
    forming the aircraft software part with the file; and
    sending the aircraft software part to an aircraft data processing system.

15. The computer implemented method of claim 13, wherein the replacing step comprises:
    responsive to a request to load a selected aircraft software part in the set of aircraft software parts on the aircraft, authenticating the selected aircraft software part using an associated new signature from the aircraft software part in place of an old signature associated with the selected aircraft software part; and responsive to the selected aircraft software part being successfully authenticated, loading the selected aircraft software part onto a line replaceable unit on the aircraft.

16. The computer implemented method of claim 15, wherein the request is sent by an aircraft mechanic.

17. An apparatus comprising:
an aircraft data processing system in an aircraft; and
a software application located on the aircraft data processing system, wherein the software application is capable of receiving an aircraft software part having a set of signatures associated with a set of aircraft software parts in the aircraft data processing system and using a selected signature in the set of signatures in a file to authenticate a selected aircraft software part in the set of aircraft software parts stored on the aircraft data processing system to form an authenticated aircraft software part, loading the authenticated software part onto a line replaceable unit in the aircraft, and replacing a set of old signatures in the line replaceable unit with the set of signatures.

18. The apparatus of claim 17 further comprising:
a second data processing system; and
a aircraft software part management application located on the second data processing system, wherein the aircraft software part management application is capable of identifying the set of aircraft software parts; placing the set of signatures associated with the set of aircraft software parts in the file; and sending the file to the aircraft data processing system as a aircraft software part.

19. A non-transitory computer readable storage medium comprising:
program code, stored on the non-transitory computer readable storage medium, for identifying a set of aircraft software parts;
program code, stored on the non-transitory computer readable storage medium, for placing a set of signatures associated with the set of aircraft software parts in a file to form a aircraft software part;
program code, stored on the non-transitory computer readable storage medium, for sending the aircraft software part to an aircraft data processing system; and
program code, stored on the non-transitory computer readable storage medium, for replacing a set of old signatures stored on the aircraft with the set signatures.

20. The non-transitory computer readable storage medium of claim 19 further comprising:
program code, stored on the non-transitory computer readable storage medium, for storing the aircraft software part in the aircraft data processing system;
program code, stored on the non-transitory computer readable storage medium, for using a selected signature in the set of signatures in the aircraft software part to authenticate a selected aircraft software part in the set of aircraft software parts stored on the aircraft data processing system to form an authenticated aircraft software part; and
program code, stored on the non-transitory computer readable storage medium, for loading the authenticated software part onto a line replaceable unit in the aircraft data processing system.

* * * * *